United States Patent
Lee et al.

(10) Patent No.: US 8,416,439 B2
(45) Date of Patent: Apr. 9, 2013

(54) PRINTING METHOD OF ATTACHED FILE, AND IMAGE FORMING APPARATUS AND IMAGE FORMING SYSTEM EMPLOYING THE SAME

(75) Inventors: Jae-yoon Lee, Seoul (KR); Kyeong-wook Ha, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 864 days.

(21) Appl. No.: 12/503,215

(22) Filed: Jul. 15, 2009

(65) Prior Publication Data

US 2010/0060928 A1 Mar. 11, 2010

(30) Foreign Application Priority Data

Sep. 8, 2008 (KR) .................................. 2008-88498

(51) Int. Cl.
- G06F 3/12 (2006.01)
- H04N 1/40 (2006.01)
- H04N 1/387 (2006.01)

(52) U.S. Cl.
USPC .......................... 358/1.15; 358/3.28; 358/450

(58) Field of Classification Search .................. 358/1.15, 358/1.18, 1.16, 1.17, 3.28, 450
See application file for complete search history.

(56) References Cited

U.S. PATENT DOCUMENTS

| | | | |
|---|---|---|---|
| 7,283,272 B2* | 10/2007 | Johnson et al. | 358/1.15 |
| 2007/0103771 A1* | 5/2007 | Stenton et al. | 359/366 |
| 2007/0177203 A1* | 8/2007 | Kamasuka et al. | 358/1.15 |
| 2007/0285721 A1* | 12/2007 | Sato | 358/1.18 |
| 2008/0049245 A1* | 2/2008 | Kamasuka et al. | 358/1.15 |
| 2008/0062883 A1* | 3/2008 | Shima | 370/241 |
| 2008/0068646 A1* | 3/2008 | Kobayashi | 358/1.15 |

FOREIGN PATENT DOCUMENTS

| | | |
|---|---|---|
| JP | 2004-237491 | 8/2004 |
| JP | 2006-228007 | 8/2006 |
| JP | 2007-207037 | 8/2007 |
| KR | 10-2004-0070562 | 8/2004 |

OTHER PUBLICATIONS

Korean Office Action mailed Nov. 26, 2012, issued in corresponding Korean Application No. 10-2008-0088498.

* cited by examiner

Primary Examiner — Jerome Grant, II
(74) Attorney, Agent, or Firm — Staas & Halsey LLP (57) ABSTRACT

An attached file printing method of an image forming apparatus, and image forming apparatus and system employing the same are provided. The attached file printing method of an image forming apparatus includes: determining whether there is a printable attached file in a printing target original document or not; converting at least one of the original document and the attached file to a printing data depending on the determining result; and printing the converted printing data.

21 Claims, 6 Drawing Sheets

PRINTING METHOD OF ATTACHED FILE, AND IMAGE FORMING APPARATUS AND IMAGE FORMING SYSTEM EMPLOYING THE SAME

CROSS-REFERENCE TO RELATED APPLICATIONS

This application claims the benefit of Korean Patent Application No. 10-2008-0088498, filed in the Korean Intellectual Property Office on Sep. 8, 2008, the disclosure of which is incorporated herein by reference.

BACKGROUND OF THE INVENTION

1. Field of the Invention

Aspects of the present invention relate to a printing method of an attached file, and an image forming apparatus and an image forming system employing the same, and more particularly, to a printing method of an attached file of an image forming apparatus capable of printing an attached file attached to a document together in printing the document, and an image forming apparatus and an image forming system employing the same.

2. Description of the Related Art

Documents capable of being drawn up, read and edited by using a computer program, and capable of being printed through an image forming apparatus, include document files for a word processor (having an extension such as doc, hwp, gul, etc.), image files (having an extension such as jpg, tif, gif, etc.), and text files (having an extension of txt, etc.) An attached file inserted through an object linking and embedding (OLE) object insertion, etc., may be included in the above documents.

When printing a document to which an attached file is inserted, a conventional image forming apparatus and system have no function to print the attached file inserted to the document. Accordingly, if a user prints the attached file, there is inconvenience to copy the attached file to other storing spaces of a computer, and to separately print the attached contents after executing the copied file.

Especially, if a storage medium such as a universal serial bus (USB) memory, a hard disk drive, etc., is to be directly connected to the image forming apparatus, and a document stored in the storage medium is to be directly printed in the image forming apparatus, it is impossible to print the attached file because the computer is not used in printing. Also, it is impossible to know whether or not the attached file is included in a printing target file before printing.

SUMMARY OF THE INVENTION

Accordingly, aspects of the present invention provide an attached file printing method of an image forming apparatus to determine whether there is an attached file, and to print the attached file together with an original document depending on a predetermined determining condition when there is the attached file, and image forming apparatus and system employing the same.

According to an aspect of the present invention, an attached file printing method of an image forming apparatus is provided. The method includes determining whether a printable attached file exists in a printing target original document; converting at least one of the original document and the printable attached file to printing data depending on the determining result; and printing the converted printing data.

According to another aspect of the present invention, the attached file printing method of the image forming apparatus may further include selecting at least one of the original document and the printable attached file as a printing target document if the attached file exists.

According to another aspect of the present invention, the attached file printing method of the image forming apparatus may further include displaying the result of the determination of the existence of the printable attached file.

According to another aspect of the present invention, the displaying of the result may include displaying the original document and at least one printable attached file in a tree configuration if at least one printable attached file exists within the original document.

According to another aspect of the present invention, the determining of whether the printable attached file exists may include determining whether at least one first attached file is attached inside the original document, and whether at least one second attached file is attached inside the first attached file.

According to another aspect of the present invention, the attached file printing method of the image forming apparatus may further include selecting at least one of the second attached file as the printing target document if there is at least one second attached file.

According to another aspect of the present invention, an image forming apparatus is provided. The image forming apparatus includes an interface unit to connect a storage medium to the image forming apparatus or to a host; an object searching unit to determine whether an original document is stored in the storage medium and whether a printable attached file is included in the original document; a control unit to select at least one of the original document and the printable attached file as a printing target document; a file converting unit to convert the selected printing target document to printing data; and a printing unit to print the printing data converted in the file converting unit.

According to another aspect of the present invention, the image forming apparatus may further include a display unit to display a result of the determination by the object searching unit.

According to another aspect of the present invention, the display unit may display the original document and at least one attached file in a tree configuration if it at least one attached file is included in the original document.

According to another aspect of the present invention, the image forming apparatus may further include a selection unit to selects an attachment printing option based on the determination of the object searching unit and the result of the determination displayed in the display unit.

According to another aspect of the present invention, the attachment printing option may include at least one of an attached file searching, an attached file automatic printing, an attachment level which is a printing level of the printable attached file, whether to print only the attached file, and the original document in which the printable attached file is included.

According to another aspect of the present invention, if the file converting unit is incapable of converting the attached file to the printing data, the control unit may transmit the attached file to the host, request conversion of the transmitted attached file to the printing data, and receive the printing data converted in the host to supply it to the printing unit.

According to another aspect of the present invention, an image forming system is provided. The image forming apparatus includes: an image forming apparatus including a printing unit to form an image, and a first control unit to control printing of the printing unit; and a host including a storing unit in which a document is stored, an object searching unit to determine whether an original document is stored in the storing unit and whether a printable attached file is present in the original document, a second control unit to select at least one of the original document and the attached file as a printing target document, and a file converting unit to convert the selected printing target document to printing data and to supply the printing data to the image forming apparatus.

According to another aspect of the present invention, the host may further include a display unit to display a result of the determination by the object searching unit.

According to another aspect of the present invention, the display unit may display the original document and at least one attached file in a tree configuration if is at least one printable attached file is determined to be present in the attached document.

According to another aspect of the present invention, the host may further include a selection unit to select an attachment printing option based on the determining result displayed in the display unit.

According to another aspect of the present invention, the attachment printing option may include at least one of an attached file searching, an attached file automatic printing, an attachment level which is a printing level of the printable attached file, whether to print only the printable attached file, and of the original document in which the attached file is included.

Additional aspects and/or advantages of the invention will be set forth in part in the description which follows and, in part, will be obvious from the description, or may be learned by practice of the invention

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
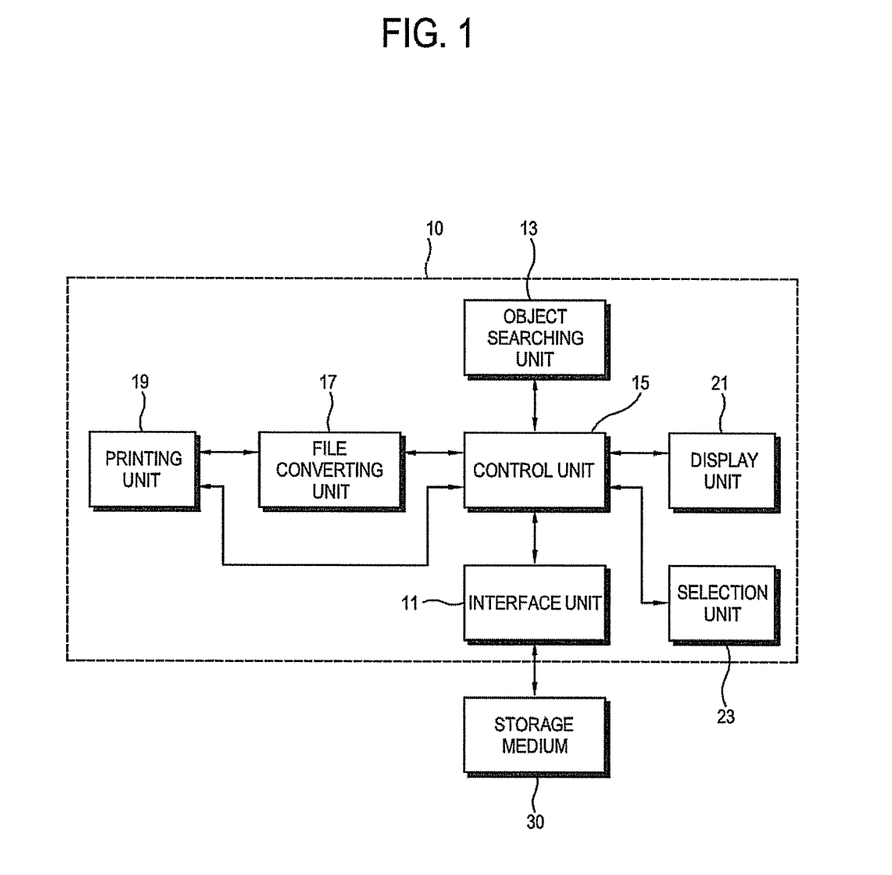
FIG. 1 is a schematic block diagram illustrating an image forming apparatus capable of direct printing according to an embodiment of the present invention.

FIG. 1 illustrates an image forming apparatus 10 capable of direct printing according to an embodiment of the present invention. The image forming apparatus 10 includes an object searching unit 13, a control unit 15, a file converting unit 17 and a printing unit 19. According to other aspects of the present invention, the image forming apparatus may include additional and/or different components. Similarly, the functionality of two or more of the above units may be integrated into a single component. The image forming apparatus 10 may be, for example, a printer, scanner, facsimile machine, or multi-function device.

The image forming apparatus 10 may directly print a target document included in a storage medium provided to an external part of the image forming apparatus, such as a universal serial bus (USB) memory, a smart card, an external hard disk drive, etc. For this purpose, the image forming apparatus 10 may further include an interface unit 11 connecting the storage medium 30 to the control unit 15 of the image forming apparatus 10.

The object searching unit 13 includes an object searching application to search for a file stored in the storage medium 30, and a file supplied from a host (hot shown). The object searching unit 13 determines whether there exists an attached file inserted in an object insertion type, etc. to an original document that is a basic printing target, and supplies the result of the determination to a user through a display unit 21. The object searching unit 13 determines whether the inserted attached file is a printable file or not.

The control unit 15 selects a printing target document based on whether the original document includes an attached file. If the attached file is found by the object searching unit 13, the control unit 15 selects at least one of the original document and the attached file attached to the original document as the printing target document. In other words, the control unit 15 selects the original document and/or the attached file as the printing target document depending on a user selection by using a selection unit 23 or a basic determined value. If the object searching unit 13 does not find an attached file, the control unit 15 selects the original document as the printing target document.

The file converting unit 17 may be implemented as an office program interpreter or a printer driver provided in the image forming apparatus 10. The file conversion unit 17 converts the selected printing target document to printing data. The printing unit 19 prints the file converted in the file converting unit 17.

The image forming apparatus 10 may further include the display unit 21 and the selection unit 23. The display unit 21 displays a result of the search by the object searching unit 13. The searching result may include a list of original documents included in the storage medium 30, inclusion of an attached file in each original document or not, a list of the attached file, etc. depending on a printer basic option determination. If there is at least one attached file, the display unit 21 may display the original document and at least one attached file in a tree configuration so that a user can immediately identify the attached files. The tree form may display an attachment hierarchy, in which one original document may have a number of attached documents, and attached documents may themselves have documents attached therein. Each level of the hierarchy may be referred to as an attachment level; thus, for example, an attached file of a first attachment level may indicate an attached file directly included in the original document, while an attached file of a second or subsidiary level may indicate an attached file included in an attached file of the first attachment level.

Figure 2:
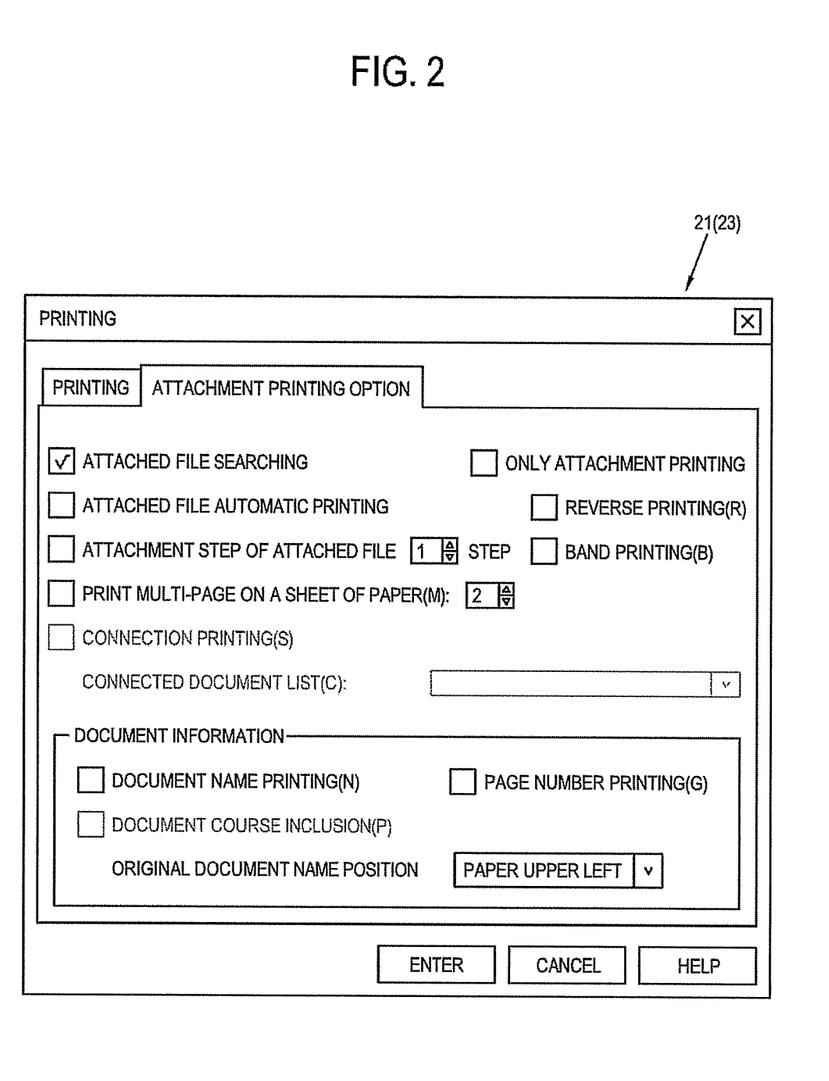
FIG. 2 illustrates a graphic user interface (GUI) screen displayed in a display unit in FIG. 1.

As shown in FIG. 2, a graphic user interface (GUI) displayed in the display unit 21 may include an attachment printing option. The attachment printing option may include options determining (1) whether to search an attached file, (2) whether to perform an attached file automatic printing, (3) what attachment level of an attached file to search/print up to if there is a continuous attached file, (for example, in case of a first level, up to an attached file of the attached file is included to the searching/printing operation), (4) an alignment order for informing what original document an attached file is attached to in printing the attached file (for example, whether to print an attached file before or after an original document), and/or (5) whether to print only the attached file of an original document or both the attached file and the original document. At least one (i.e., one or more) of these options may be displayed.

The selection unit 23 selects the attachment printing option based on contents searched in the object searching unit 13 and displayed in the display unit 21.

Figure 3:
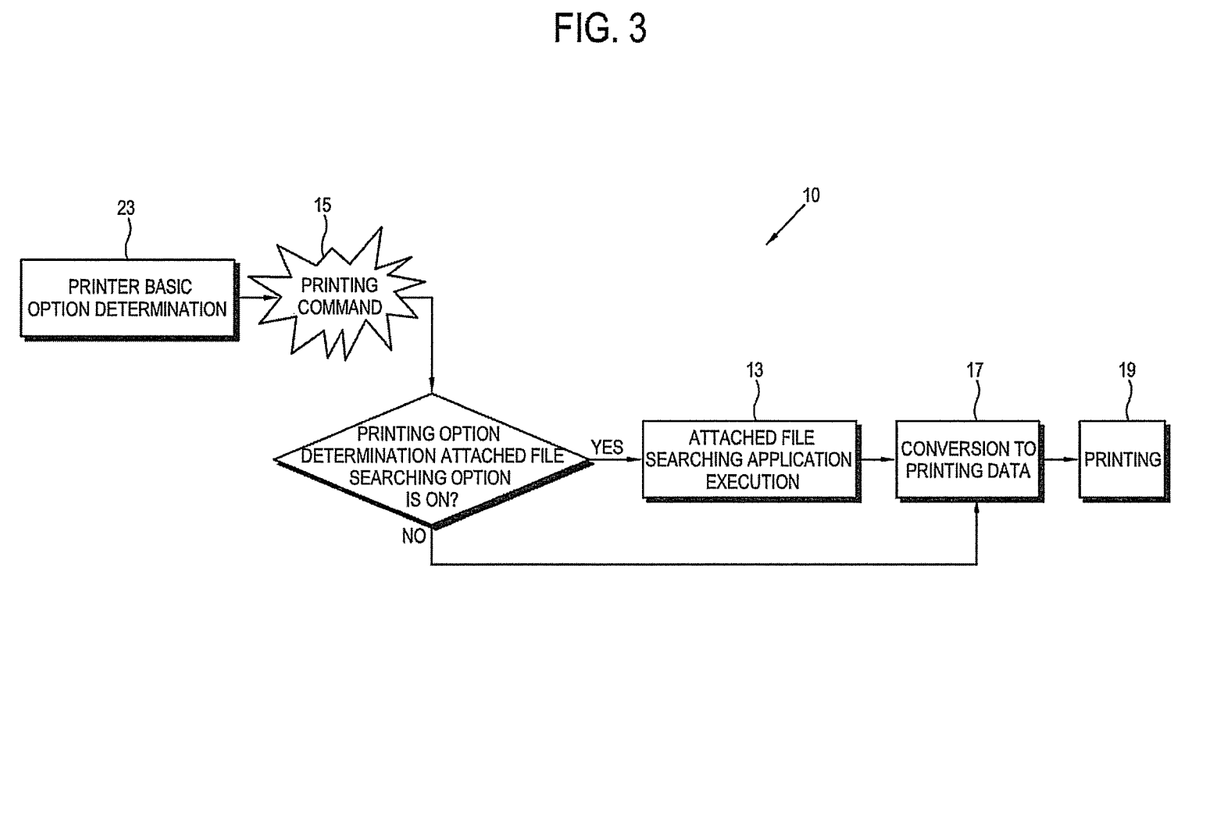
FIG. 3 schematically illustrates a printing performing operation of the image forming apparatus according to the embodiment of the present invention.

A printing performing operation of the image forming apparatus 10 will be schematically described by referring to FIG. 3. Reference numerals endowed to blocks respectively representing the printing performing operation in FIG. 3 refer to configuration elements of the image forming apparatus illustrated in FIG. 1 performing corresponding processes.

Referring to FIG. 3, a user determines a printer basic option from the attachment printing option displayed in the GUI screen through the selection unit 23. The printer basic option may use a basic option determined in a prior print job, or be reset to be appropriate to a print job to be newly performed.

If a control command is applied, the control unit 15 determines whether the attached file searching among the attachment printing options is selected, and controls the file converting unit 17 to convert only an original document to printing data if the searching option is not selected. If the searching option is selected, the control unit 15 controls the object searching unit 13 to execute an attached file searching application. The object searching unit 13 determines whether an original document and/or an attached file is included in a printing target document based on the searching application executing result and the attachment printing option or not. According to the determining result, the file converting unit 17 converts the original document and/or the attached file to a printable file, and the printing unit 19 prints the converted printable file.

Even if the object searching unit 13 extracts the attached file, the file converting unit 17 may be incapable of converting the extracted attached file to a printable file. In this case, the control unit 15 may transmit the searched attached file to a host (not shown), and request to convert the transmitted attached file to the printable file. The control unit 15 may receive the converted printable file from the host, and supply the converted printable file to the printing unit 19.

As described above, in printing a printing target file, the image forming apparatus 10 can determine whether an attached file is included in an original document before printing. Also, in being applied to an image forming apparatus of a direct printing type, since an attached file is capable of being included to a printing target document to be printed without a separate work, user convenience can be improved.

Figure 4:
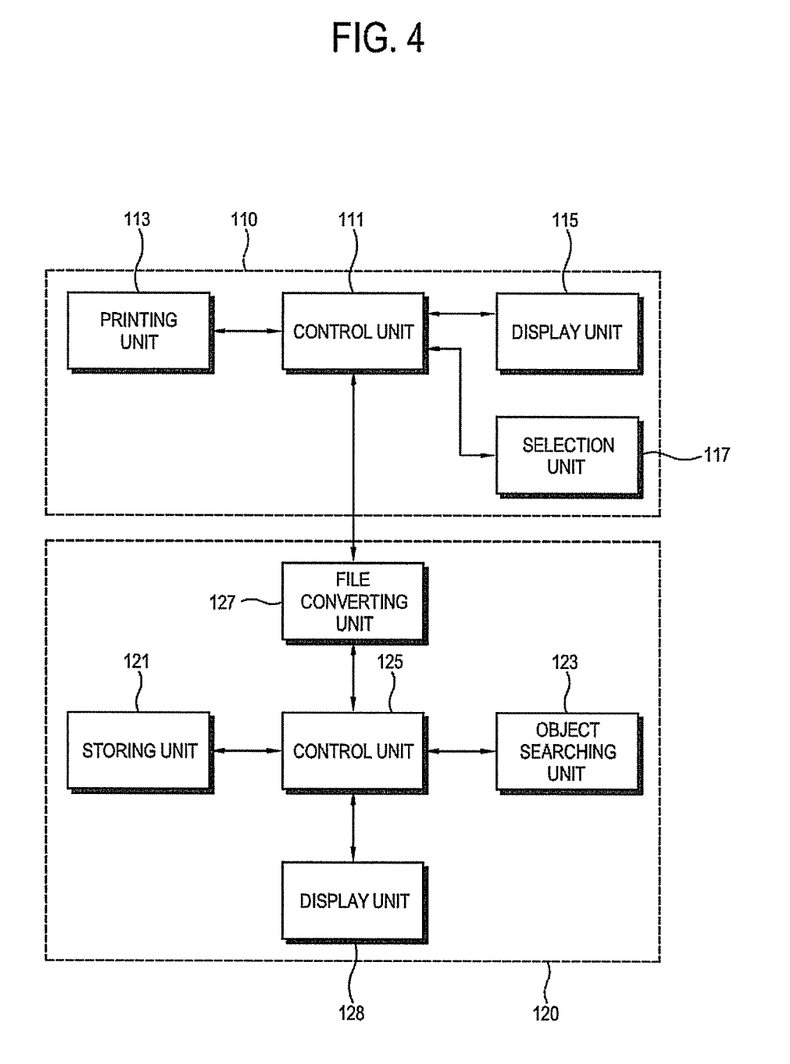
FIG. 4 is a schematic block diagram illustrating an image forming system according to an embodiment of the present invention.

FIG. 4 illustrates an image forming system according to an embodiment of the present invention. As shown in FIG. 4, an image forming system may include an image forming apparatus 110, and a host 120 connected to the image forming apparatus 110.

The image forming apparatus 110 includes a printing unit 113 forming an image, and a first control unit 111 receiving a printable file from the host 120 and supplying the printable file to the printing unit 113. The image forming apparatus 110 may further include a first display unit 115 supplying a printing determining state of the printing unit 113, etc., to a user, and a first selection unit 117 selecting a printing determining option.

The host 120 includes a storing unit 121 in which a document is stored, an object searching unit 123, a second control unit 125 and a file converting unit 127. The object searching unit 123 includes an object searching application searching for a file stored in the storing unit 121. The object searching unit 123 determines whether an attached file is present, and supplies the result of the determination to a user through a second display unit 128. The object searching unit 123 determines whether the inserted attached file is a printable file.

The second control unit 125 selects a printing target document based on whether an attached file exists in the original document. If the attached file is present, the second control unit 125 selects at least one of the original document and the attached file attached to the original document as the printing target document. The second control unit 125 selects the original document and/or the attached file as the printing target document depending on a user selection by using a second selection unit 129 or a basic determined value. If no attached file is found by the object searching unit 123, the second control unit 125 selects the original document as the printing target document.

The file converting unit 127 may be implemented as a printer driver disposed in the host 120, converts the selected printing target document to printable data, and supplies the printing data to the image forming apparatus 110.

The host 120 may further include the second display unit 128 and the second selection unit 129. The second display unit 128 displays a searching result about existence of the attached file searched in the object searching unit 123. The searching result includes a list of original documents included in the storing unit 121, inclusion of an attached file in each original document, a list of the attached file, or the like, depending on a printer basic option determination. In addition, as shown in FIG. 2, a graphic user interface (GUI) displayed in the second display unit 128 may include an attachment printing option. The attachment printing option may have the substantially same configuration as the above. The second selection unit 129 selects the attachment printing option based on contents searched in the object searching unit 123 and displayed in the second display unit 128.

Figure 5:
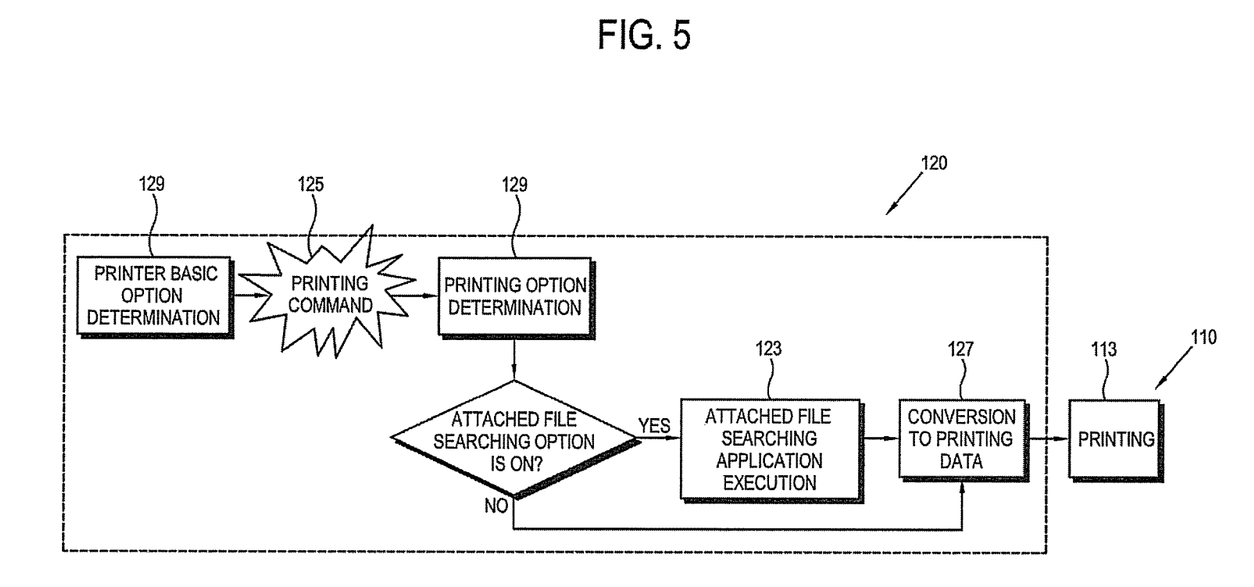
FIG. 5 schematically illustrates a printing performing operation of the image forming system according to the embodiment of the present invention.

A printing performing operation of the image forming system with reference to FIG. 5. Reference numerals endowed to blocks respectively representing the printing performing operation in FIG. 5 refer to configuration elements of the image forming apparatus illustrated in FIG. 4 performing corresponding processes.

Referring to FIG. 5, a user determines a printer basic option from the attachment printing option displayed in the GUI screen through the second selection unit 129. If a control command is applied, the second control unit 129 determines whether the attached file searching among the attachment printing options is selected, and controls the file converting unit 127 to convert only an original document to printing data if the searching option is not selected. If the searching option is selected, the second control unit 129 controls the object searching unit 123 to execute an attached file searching application. The object searching unit 123 determines whether an original document and/or an attached file is included in a printing target document based on the attached file searching application executing result and the attachment printing option. According to the determining result, the file converting unit 127 converts the original document and/or the attached file to a printable file, and supplies the converted printable file to the printing unit 113 of the image forming apparatus 100. The printing unit 113 prints the converted printable file.

In case of configuring the image forming system as described above, in printing a file, if an attached file is included in an original document, the attached file is capable of being included in a printing target document to be printed without performing addition operations, such as copying the attached file, executing the attached file, or the like, thereby improving user convenience.

Figure 6:
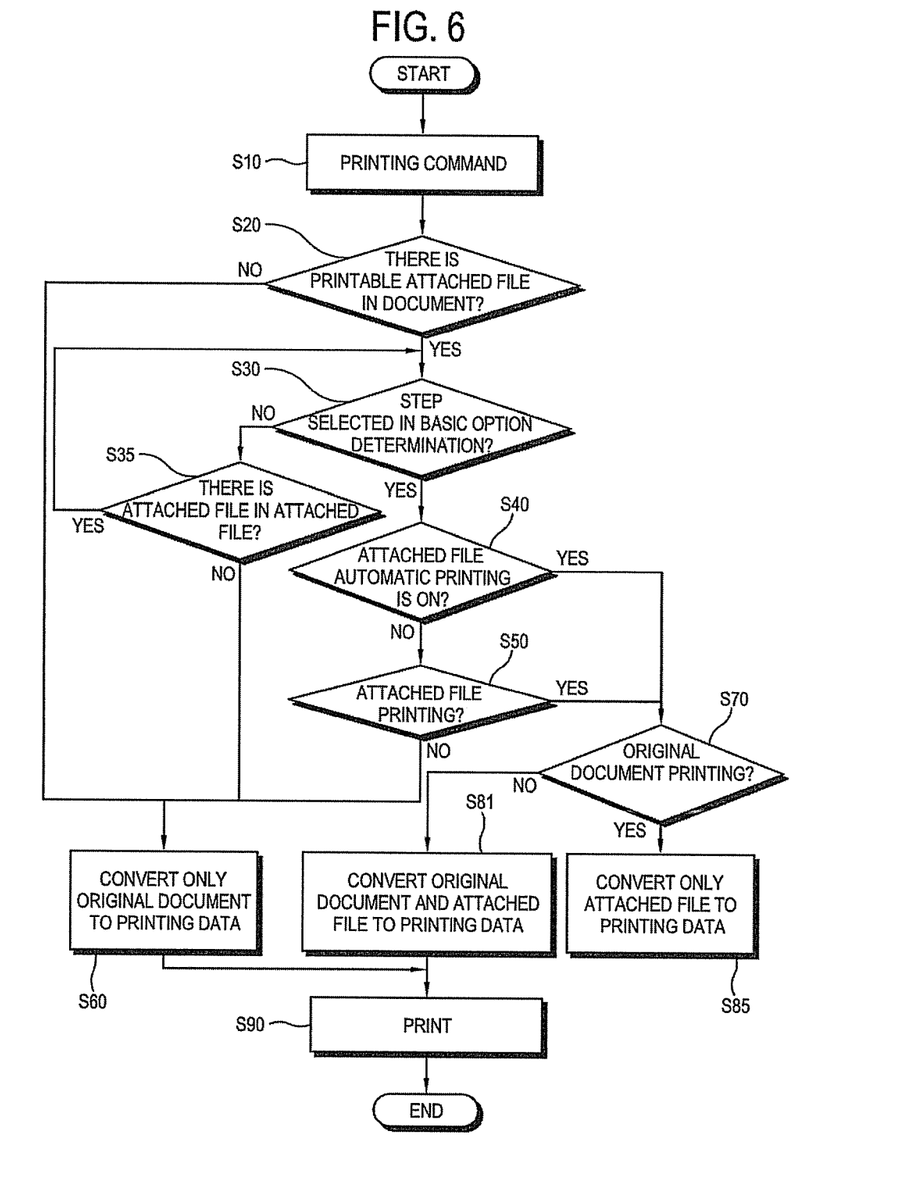
FIG. 6 is a flowchart illustrating an attached file printing process of an image forming apparatus according to an embodiment of the present invention.

A printing process of an attached file of an image forming apparatus according to an embodiment of the present invention will be described with reference to FIG. 6. Here, the printing method of the attached file of the image forming apparatus may be applied to the image forming system described by referring to FIGS. 4 and 5 as well as the image forming apparatus described by referring to FIGS. 1 to 3.

In selecting printing in operation S10, whether there is a printable attached file in an original document is determined by an object searching unit (including an object searching application disposed in an image forming apparatus or a host) in operation S20. Depending on the result of the determination, at least one of the original document and the attached file is converted to printing data. Either the original document or the attached file, or both, are converted to the printing data if the attached file is present, and the original document is converted to the printing data if there is no attached file. The converting to the printing data is performed through operations S60, S81 and S85. The printing data converted as described above is printed in operation S90.

The printing process may further include an operation of selecting at least one of the original document and the attached file as a printing target document if the attached file is present. The printing process may further include an operation of displaying the determining result with respect to the existence of the attached file. In the displaying operation, the result of the determination may be displayed in a tree configuration so that a user can immediately identify the original document and at least one attached file if there is at least one attached file.

The selecting operation of the printing target document may include an operation S30 of determining whether the attached file is a document of a determined attachment level. The selecting operation includes an operation of determining whether the attachment level is a level selected in a basic option determination. In operation S30, if the attached file is determined as a document of the determined attachment level, the attachment file is included in the printing target document.

If the attached file is not determined as a document of the determined attachment level in the operation S30, an operation S35 of determining whether a second attached file of a subsidiary level is present in the attached file may be performed (S35). In operation S35, if the second attached file of a subsidiary level is present in the first attached file, the operation S30 is performed again. On the other hand, if there is no second attached file, the operation S60 is performed.

The selecting operation of the printing target document may further include an operation S40 of determining whether to perform an automatic printing of an attached file through an attached file automatic printing option. If the automatic printing option is selected, the attached file is included with the printing target document. If the automatic printing option is selected in the operation S40, an operation S70 of determining whether to include the original document to the printing target document or not may be further included.

If the automatic printing option is not selected in the operation S40, an operation S50 of determining whether to perform an attached file printing or not may be further included. If the attached file printing is selected, the attached file is included in the printing target document. An operation S70 of determining whether to include the original document to the printing target document may be further included. If the original document inclusion is selected in the operation S70, the original document and the attached file are included to the printing target document, and all are converted to a printing data in operation S81. If the original document inclusion is not selected, the original document is excluded from the printing target document. Thus, only the attached file is converted to the printing data in operation S85. If the attached file printing is not selected, the attached file is excluded from the printing target document, and the operation S60 is performed.

In printing a file, if an attached file is included to an original document, an image forming apparatus and system according to aspects of the present invention are capable of including the attached file to a printing target document and printing the attached file without separately performing a work such as copying of the attached file, executing of the attached file, etc., thereby improving user convenience.

When configuring an image forming apparatus of a direct printing type, if a printing target file in a storage medium is to be printed, systems and methods according to aspects of the present invention can determine whether an attached file is included in an original document before printing. The attached file can be included to the printing target document to be printed without separate effort by the user, thereby improving user convenience.

Also, as described above, an attached file printing method of an image forming apparatus according to aspects of the present invention determines whether an attached file is included in a document by using a searching application, and then includes the original document and/or the attached file to a printing target document according to a basic option or a user selection to perform printing, thereby improving user convenience. Especially, in being applied to a direct printing type, it can be determined whether an attached file is included in a document included in a storage medium, and the attached file can be printed without assistance of a host if the attached file is present.

Aspects of the present invention may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CDs or other optical information storage media, magnetic tapes, floppy disks, and information data storage devices. Aspects of the present invention may also be embodied as carrier waves (such as data transmission through the Internet). The computer readable recording medium can also be distributed over network coupled computer systems so that the computer readable code is stored and executed in a distributed fashion. Also, functional programs, codes, and code segments for accomplishing the recording/reproducing method can be easily construed by programmers skilled in the art to which the present invention pertains.

Although a few embodiments of the present invention have been shown and described, it would be appreciated by those skilled in the art that changes may be made in this embodi-

What is claimed is:

1. An attached file printing method of an image forming apparatus, comprising:
   determining whether a attached file searching option among a attachment printing options is selected;
   determining whether a printable attached file exists within a printing target original document if the attached file searching option is selected;
   converting the printable attached file together with the original document to printing data depending on the determining result; and
   printing the converted printing data.

2. The attached file printing method of the image forming apparatus according to claim 1, further comprising:
   selecting the original document and the printable attached file as a printing target document if the printable attached file exists.

3. The attached file printing method of the image forming apparatus according to claim 1, further comprising displaying the result of the determination of the existence of the printable attached file.

4. The attached file printing method of the image forming apparatus according to claim 3, wherein the displaying of the result comprises displaying the original document and at least one printable attached file in a tree configuration if at least one printable attached file exists within the original document.

5. The attached file printing method of the image forming apparatus according to claim 1, wherein the determining of whether the printable attached file exists comprises determining whether at least one first attached file is attached inside the original document, and whether at least one second attached file is attached inside the first attached file.

6. The attached file printing method of the image forming apparatus according to claim 5, further comprising selecting at least one of the second attached file as the printing target document if there is at least one second attached file.

7. An image forming apparatus, comprising:
   an interface unit to connect a storage medium to the image forming apparatus or to a host;
   a control unit to determine whether a attached file searching option among a attachment printing options is selected;
   an object searching unit to determine whether an original document stored in the storage medium and whether a printable attached file is included in the original document if the attached file searching option is selected;
   a selection unit to select the printable attached file together with the original document as a printing target document;
   a file converting unit to convert the selected printing target document to printing data; and
   a printing unit which prints the printing data converted in the file converting unit.

8. The image forming apparatus according to claim 7, further comprising a display unit to display result of the determination by the object searching unit.

9. The image forming apparatus according to claim 8, wherein the display unit displays the original document and at least one printable attached file in a tree configuration if at least one attached file is included in the original document.

10. The image forming apparatus according to claim 9, wherein the selection unit selects an attachment printing option based on the determination of the object searching unit and the result of the determination displayed in the display unit.

11. The image forming apparatus according to claim 8, wherein the attachment printing option further comprises at least one an attached file automatic printing, an attachment level which is a printing level of the printable attached file, whether to print only the printable attached file, and the original document in which the printable attached file is included.

12. The image forming apparatus according to claim 7, wherein, if the file converting unit is incapable of converting the attached file to the printing data, the control unit transmits the attached file to the host, requests conversion of the transmitted attached file to the printing data, and receives the printing data converted in the host to supply the received printing data to the printing unit.

13. An image forming system, comprising:
   an image forming apparatus including a printing unit to form an image, and a first control unit to control printing of the printing unit; and
   a host including a storing unit, a second control unit to determine whether a attached file searching option among a attachment printing options is selected, an object searching unit to determine whether an original document is stored in the storing unit and whether a printable attached file is present in the original document if the attached file searching option is selected, a selection unit to select the printable attached file together with the original document as a printing target document, and a file converting unit to convert the selected printing target document to printing data and to supply the printing data to the image forming apparatus.

14. The image forming system according to claim 13, wherein the host further comprises a display unit to display a result of the determination by the object searching unit.

15. The image forming system according to claim 14, wherein the display unit displays the original document and at least one printable attached file in a tree configuration if at least one printable attached file is determined to be present in the original document.

16. The image forming system according to claim 14, wherein the selection unit selects the attachment printing option based on the determining result displayed in the display unit.

17. The image forming system according to claim 16, wherein the attachment printing option further comprises at least one of an attached file automatic printing, an attachment level which is a printing level of the printable attached file, whether to print only the printable attached file, and the original document in which the printable attached file is included.

18. A host device connectable to an image forming apparatus, the host device comprising:
   a storage unit in which at least one document is stored;
   control unit to determine whether a attached file searching option among a attachment printing options is selected;
   an object searching unit to determine whether an original document is stored in the storage unit, to determine whether an attached file is included in the original document if the attached file searching option is selected, and to determine whether the attached file is a printable attached file;
   a selection unit to select the printable attached file with the original document as a printing target document based on the determination of the object searching unit as to the presence of the attached file and whether the attached file is a printable attached file; and a file converting unit to convert the selected printing target document into printing data to be supplied to the image forming apparatus for printing.

19. The host device of claim 18, wherein the selection unit selects the original document and/or the attached file as the printing target document based on user input and the determination of the object searching unit.

20. The host device of claim 18, further comprising: a display unit to display a result of the determination of the object searching unit, including any original documents and attached files determined to be stored in the storage unit.

21. The host device of claim 20, wherein the display unit displays a hierarchy of original documents and attached files.

* * * * *